(12) United States Patent
Winkler

(10) Patent No.: US 11,165,272 B2
(45) Date of Patent: Nov. 2, 2021

(54) DEVICE CHARGER ATTACHMENT

(71) Applicant: Motorola Mobility LLC, Chicago, IL (US)

(72) Inventor: David A Winkler, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 244 days.

(21) Appl. No.: 14/872,643

(22) Filed: Oct. 1, 2015

(65) Prior Publication Data

US 2017/0098952 A1    Apr. 6, 2017

(51) Int. Cl.
*H02J 7/02* (2016.01)
*H02J 50/12* (2016.01)
*H02J 7/00* (2006.01)
*H02J 50/80* (2016.01)

(52) U.S. Cl.
CPC .............. *H02J 7/025* (2013.01); *H02J 50/12* (2016.02); *H02J 7/0042* (2013.01); *H02J 50/80* (2016.02)

(58) Field of Classification Search
CPC .. H02J 17/00; H02J 5/005; H02J 50/10; H02J 50/12; H02J 50/50
USPC ........................................................ 320/108
See application file for complete search history.

(56) References Cited

U.S. PATENT DOCUMENTS

| | | | |
|---|---|---|---|
| 2007/0182367 A1* | 8/2007 | Partovi ................... | H01F 5/003 320/108 |
| 2009/0096413 A1* | 4/2009 | Partovi ................... | H01F 5/003 320/108 |
| 2011/0181238 A1* | 7/2011 | Soar ........................ | B60N 2/24 320/108 |
| 2012/0153732 A1* | 6/2012 | Kurs ...................... | B60L 3/0069 307/104 |
| 2012/0189146 A1* | 7/2012 | Wuidart ............. | H04M 1/6066 381/312 |
| 2013/0082536 A1* | 4/2013 | Taylor ..................... | H02J 7/025 307/104 |
| 2014/0028252 A1* | 1/2014 | Vuori ...................... | H02J 5/005 320/108 |
| 2015/0180284 A1* | 6/2015 | Kang ..................... | H02J 17/00 307/104 |
| 2015/0256226 A1* | 9/2015 | Lin ....................... | H04B 5/0037 307/104 |

OTHER PUBLICATIONS

IDT Wireless Power Transmitter/Receiver; Preliminary Product Datasheet; Revision 0.0.05; Published in 2015 Integrated Device Technology Inc.

* cited by examiner

*Primary Examiner* — David V Henze-Gongola

(57) ABSTRACT

Systems and methods for wireless power transmission between a portable communication device and an add-on module allow a resonator coil in the portable communication device to both transmit and receive power. In an embodiment, the portable communication device provide power via various on time duty cycles based on a type of the add-on module.

14 Claims, 4 Drawing Sheets

DEVICE CHARGER ATTACHMENT

TECHNICAL FIELD

The present disclosure is related generally to charging of portable communication devices, and, more particularly, to a system and method for wirelessly interfacing such as device to a companion device for charging.

BACKGROUND

One of the biggest reliability challenges for a portable device is its connectors. This is especially true with respect to charging connectors, which are repeatedly connected and disconnected on a daily basis. Not only do the wires of such connectors eventually fray, but the contacts themselves may become worn, misaligned, or corroded.

The present disclosure is directed to a system that can eliminate some of the shortcomings noted above. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this Background section as admitted or assumed prior art. Moreover, the identification herein of desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
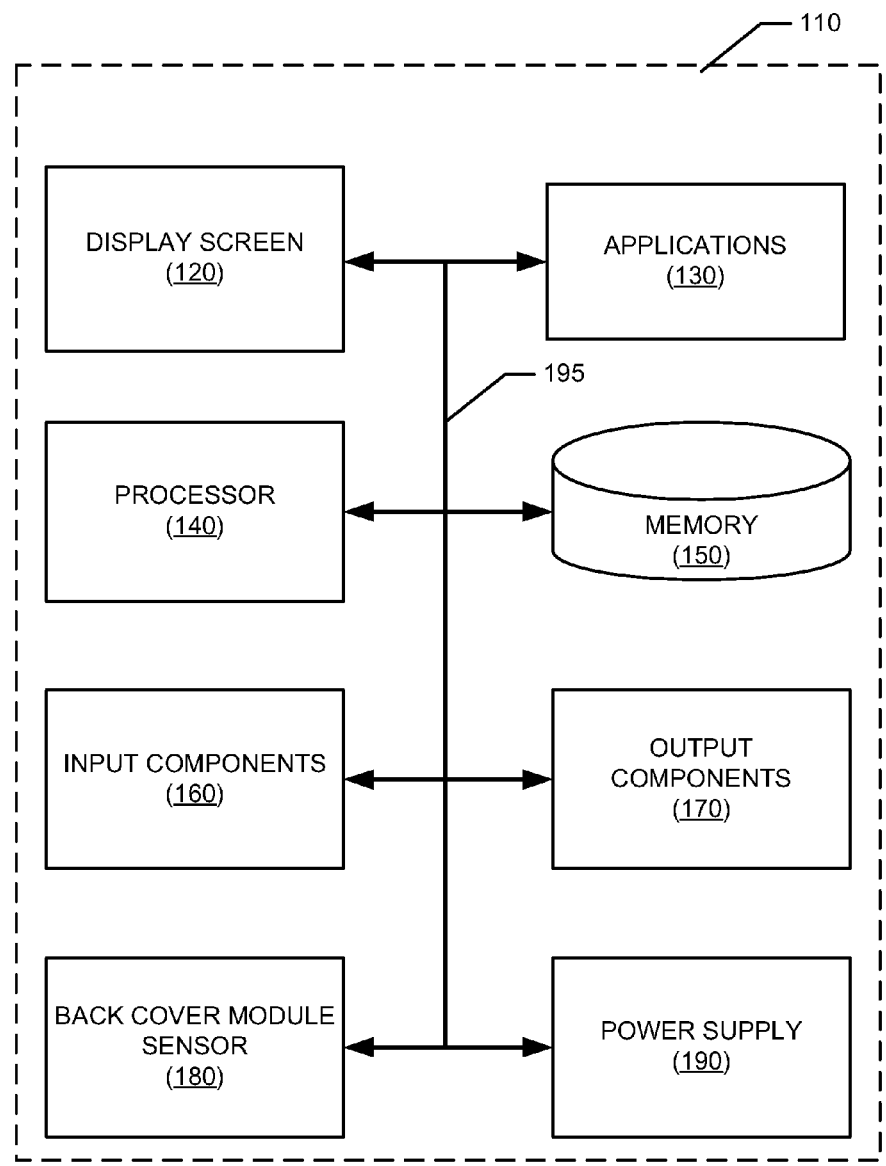
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, one of the biggest reliability challenges for a portable device is its connectors. This is especially true with respect to charging connectors, which are repeatedly connected and disconnected on a daily basis. Not only do the wires of such connectors eventually fray, but the contacts themselves may become worn, misaligned, or corroded.

In an embodiment, a Receiver (RX)/Transmitter (TX) wireless charging solution is provided. In particular, magnetic resonant wireless charging is used in an embodiment with a contactless back cover. The device battery can be charged with the back cover in place, and the device may also provide power for back cover electronic units via various on time duty cycles to save power.

In an embodiment, the back cover module stores power in one or more capacitors to provide power between TX bursts. In addition, the back cover resonator enhances efficiency of the device resonator in a further embodiment. The ability to exchange power between the device and the back cover device allows users to personalize their device with particularly applicable back cover electronics. That is, the user is able to attach a selected back cover to the device and power it without a connector interface.

The back cover may support an e-ink low power display, biomedical functions etc. Moreover, with the use of magnetic resonance charging (A4WP), the user is able to charge wearables such as battery powered earpieces by placing them near the back of the device. Communication between the back cover circuitry and the device may be via the Bluetooth Low Energy protocol which is integrated within the A4WP function.

Power consumption should be managed for portable devices, since they are typically battery-powered, and a battery charge must typically last for a long period of time, e.g., a day. Thus, powering the back cover module should be executed in an efficient manner.

In an embodiment, in order to increase the efficiency of power exchange between the device and the back cover module, the power exchange is driven with a duty cycle that is generally less than 100%. A storage capacitor within the back cover module may provide interim power while the wireless charge field is in a low power mode. However, the charging duty cycle should be a function of, or at least not inconsistent with, the power demands of the operation being performed. For instance while charging a wearable device, it may be logical to use a 100% duty cycle, since you are charging the battery on the remote device.

Wireless exchange between the device and the back cover module is facilitated by eliminating or minimizing shielding on the module receiver resonator so that the transmitter flux extends beyond the back cover coil, allowing coupling to the external device. This elimination of shielding also enables charging of the device on an A4WP charging pad.

Further, in order for the device to couple with the back cover module, the device is configured to detect the presence of the module. In an embodiment, detection of the back cover module is executed via a paired permanent magnet in the back cover module and a magnetic pick-up on the device. Alternatively, short wireless pings from the device may be used to power the back cover module and allow it to advertise per the A4WP specification. This may require a minimum transmission period in order to maintain compatibility with external A4WP devices.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device 110 further includes one or more back cover module sensors 180 configured to provide a signal indicative of the presence or absence of a back cover module on the device 110.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Figure 2:
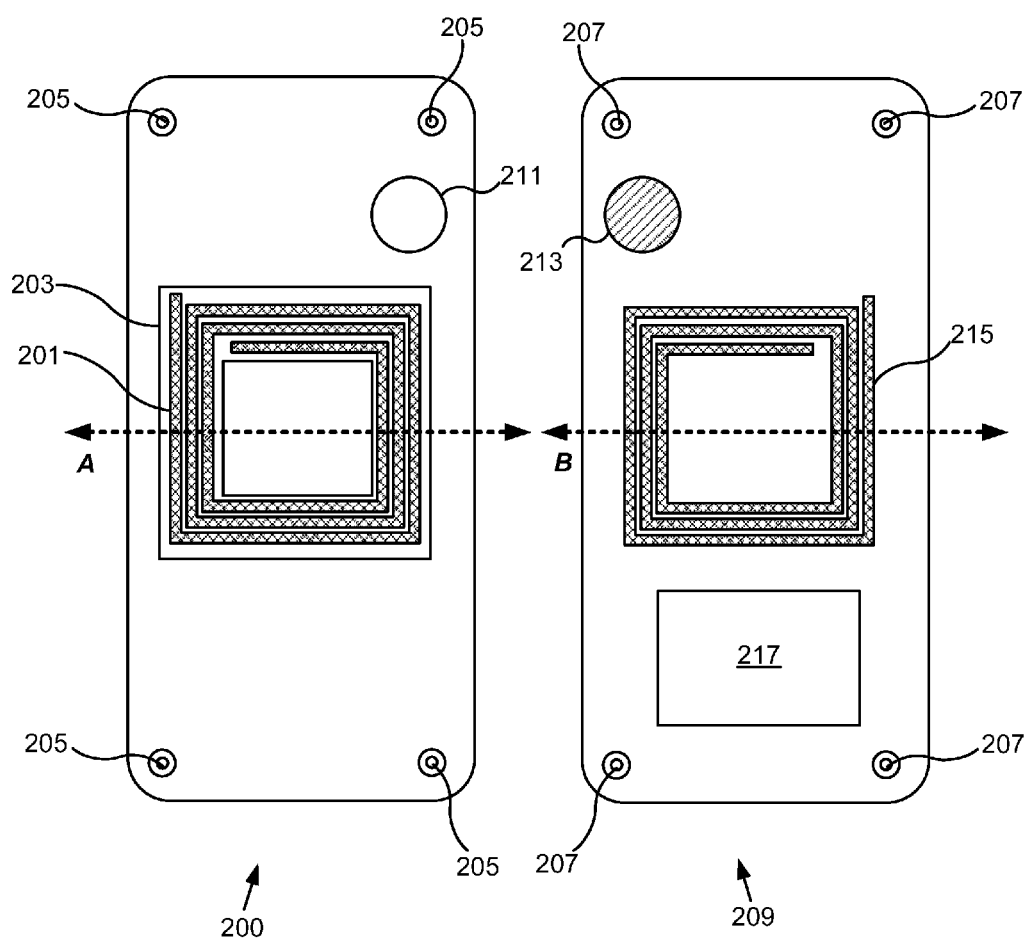
FIG. 2 is a simplified plan view of a portable communication device and a mating back cover module in accordance with an embodiment of the disclosed principles.

Turning to FIG. 2, this figure shows a simplified plan view of a portable communication device, i.e., a mobile device, and a mating back cover module. As can be seen, in the illustrated embodiment, the portable communication device 200 includes a resonator 201 overlying a shield 203.

In addition, the portable communication device 200 includes one or more alignment and retaining features to keep the back cover module attached and in place when the devices are docked together. In the illustrated embodiment, these features include a plurality of magnets 205, which are positioned to register with corresponding ferrous disks 207 on the back cover module 209.

The portable communication device 200 also includes a magnetic pick-up 211 in an embodiment, positioned to register with a corresponding detection magnet 213 on the back cover module 209. As can be seen, the back cover module 209 also includes a resonator 215 but no shield. In this way, the flux of the resonator 201 associated with the portable communication device 200 is able to encompass the resonator 215 of the back cover module 209.

To emphasize that the back cover module 209 may be a full electronic module, a printed circuit board (PCB) 217 is also shown. It will be appreciated that the portable communication device 200 also includes a PCB.

Wireless exchange between the device and the back cover module is facilitated by eliminating or minimizing shielding on the module 209 resonator 215 so that the transmitter flux of the portable device 200 resonator 201 extends beyond the back cover coil, allowing coupling to the external device. This elimination of shielding also enables charging of the device on an ordinary A4WP charging pad.

Figure 3:
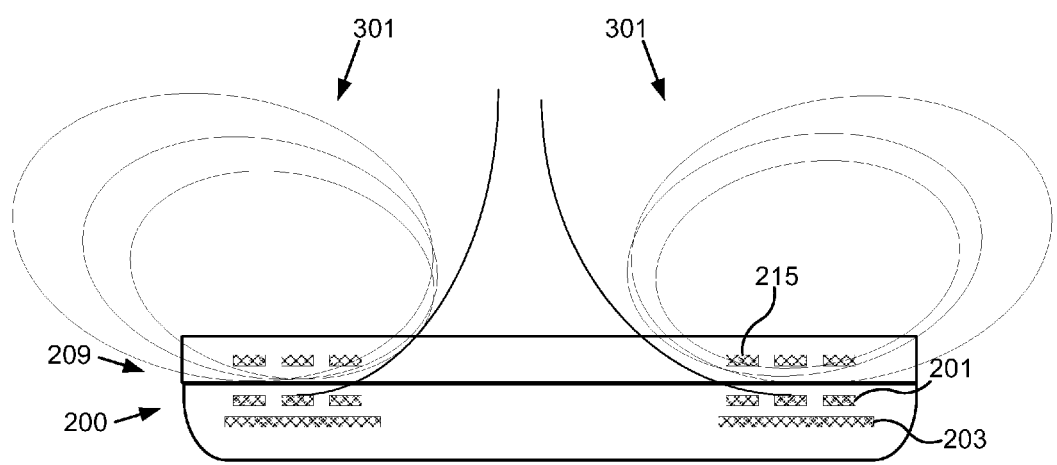
FIG. 3 is a cross-sectional end view of portable communication device and a docked back cover module in accordance with an embodiment of the disclosed principles.

In this connection, FIG. 3 shows a cross-sectional end view of the portable communication device 200 and the docked back cover module 213. The cross-section is taken through each device at its respective bisector A, B. As can be seen, the shielded resonator coil 201 of the portable communication device 200 generates a magnetic field represented by a flux emission and receipt pattern 301 that encompasses the resonator coil 215 of the back cover module 209.

As noted above, the back cover module 209 may include an e-ink low power display, biomedical function modules and so on. Moreover, although the back cover module 209 is shown to be the same size as the portable device in the illustrated embodiments, it will be appreciated that the back cover module 209 may be of a substantial size and form. For example, as also noted above, the system allows magnetic resonance charging (A4WP) to be used to charge wearables such as battery powered earpieces by placing them near the back of the device.

It was briefly mentioned in summary above that in order to increase the efficiency of power exchange between the device and the back cover module, the power exchange may be driven with a duty cycle that is generally less than 100% but that more specifically depends upon the character of the module 209. For example, if the module 209 requires power to operate, a certain duty cycle may be used, with a storage capacitor in the module 209 being used to buffer power delivery. Alternatively, in the case of charging a wearable or other device, it would be more appropriate to use a 100% duty cycle.

Figure 4:
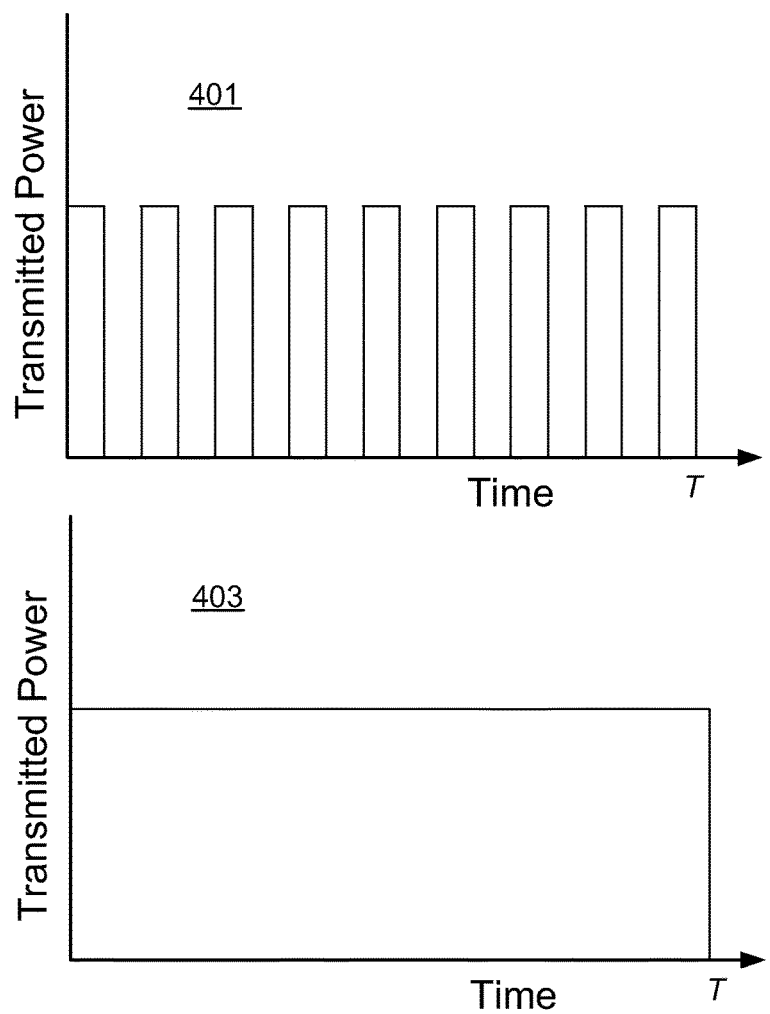
FIG. 4 is a data diagram showing two simplified data plots corresponding to different charging profiles in accordance with an embodiment of the disclosed principles.

FIG. 4 shows a pair of duty cycle maps 401, 403 for power exchange from the portable communication device 200 to the add on module 209. In particular, the plot 401 shows a duty cycle for power transmission when the external module 209 is a logical unit, e.g., an active module running at least simple code for executing some function. In this case, the goal is simply to maintain power, and the applicable duty cycle is 50%. However, the plot 403 shows a duty cycle for power transmission when the external module 209 is a power unit to be filled, e.g., a battery. In this case, the goal is to charge the battery and so the applicable duty cycle is 100%.

In order for the device 200 to configure its behavior with respect to the back cover module 209, the device is configured to detect the presence and identity of the module 209. As noted above, in an embodiment, detection of the back cover module 209 may be executed via a paired permanent magnet in the back cover module 209 and a magnetic pick-up on the device 200. However, while this allows detection of the module 209, it will not typically provide sufficient data capability to identify the type of the module 209 in an environment where it is possible to have different module types.

Thus, in an alternative embodiment, the device 200 emits short wireless pings to power the back cover module 209 and allow it to then advertise per the A4WP specification. In this way, the device 209 is able to identify the module 209 and hence its needs and capabilities.

It will be appreciated that various systems and processes for facilitating power exchange between a portable communication device and an add-on module have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A portable electronic communication device comprising:
   a resonator coil;
   a sensor configured to sense a presence of an add-on module having a resonator coil that is placed on the portable electronic communication device; and
   a processor configured to drive the resonator coil of the portable electronic communication device to transmit power to the add-on module via the resonator coil of the add-on module, the processor being further configured to, upon the sensor sensing the presence of the add-on module, transmit a series of power pulses to the add-on module to power a type response from the add-on module, to receive the type response from the add-on module, wherein the type response identifies a type of the add-on module, and to subsequently modify power transmission based on the type of the add-on module by modifying an on time duty cycle of power transmission.

2. The portable electronic communication device in accordance with claim 1, further comprising a shield underlying the resonator coil of the portable electronic communication device.

3. The portable electronic communication device in accordance with claim 1, further comprising a magnetic pick-up placed to register with a magnet on the add-on module, and wherein the processor is further configured to detect the presence of the add-on module based on a signal from the magnetic pick-up when the magnetic pick-up responds to the magnet on the add-on module.

4. The portable electronic communication device in accordance with claim 1, wherein the type response from the add-on module comprises an A4WP signal from the add-on module.

5. The portable electronic communication device in accordance with claim 1, further comprising a plurality of retaining magnets positioned to register to corresponding ferrous plates on the add-on module to retain the add-on module to the portable electronic communication device.

6. The portable electronic communication device in accordance with claim 1, wherein the add-on module is a user wearable.

7. The portable electronic communication device in accordance with claim 6, wherein the add-on module is a user earpiece, and the processor is configured to charge the battery of the user earpiece via a power transmission having an on time duty cycle of substantially 100%.

8. A device power exchange system comprising:
   a portable electronic communication device;
   a first resonator coil associated with the portable electronic communication device;
   an add-on module separate from the portable electronic communication device;
   a second resonator coil associated with the add-on module; and
   a processor associated with the portable electronic communication device configured to drive the second resonator coil to transmit power to the add-on module and to receive power from an external charger field from a magnetic resonance charger pad having a third resonator coil, wherein the first resonator augments power transfer via resonance between the first and second resonator coils, and the first and third resonator coils, wherein for power transmission to the add-on module, the processor is further configured to transmit a series of power pulses to the add-on module to power a type response from the add-on module, to receive the type response from the add-on module, wherein the type response identifies a type of the add-on module and to modify an on time duty cycle of the power transmission based on the detected type.

9. The device power exchange system in accordance with claim 8, further comprising a shield underlying the resonator coil of the portable electronic communication device.

10. The device power exchange system in accordance with claim 8, wherein the portable electronic communication device further comprises a magnetic pick-up located to register with a magnet on the add-on module, and wherein the processor is further configured to detect the presence of the add-on module based on a signal from the magnetic pick-up when the magnetic pick-up responds to the magnet on the add-on module.

11. The device power exchange system in accordance with claim 8, wherein the a type response is a Bluetooth Low Energy A4WP signal.

12. The device power exchange system in accordance with claim 8, further comprising a plurality of retaining magnets positioned to register to corresponding ferrous plates on the add-on module to retain the add-on module to the portable electronic communication device.

13. The device power exchange system in accordance with claim 8, wherein the add-on module is a user wearable.

14. A method of charging an add-on module having an add-on resonator coil docked to a portable communication device having a device resonator coil, the method comprising:
- detecting that the add-on module has been placed in contact with the portable communication device;
- identifying a type of the add-on module by transmitting a series of power pulses to the add-on module via the first and second resonator coils to power a type response from the add-on module, and receiving the type response from the add-on module, wherein the type response identifies the type of the detected add-on module;
- subsequently transmitting power wirelessly from the device resonator coil to the add-on resonator coil by modifying an on time duty cycle of the power transmission based on the detected type; and
- receiving a wireless power signal at the device resonator coil from the add-on resonator coil.

\* \* \* \* \*